United States Patent [19]

Verhoeven

[11] 3,825,680

[45] July 23, 1974

[54] RECEIVER FOR VIDEO SIGNALS

[75] Inventor: Leonardus Adrianus Johannes Verhoeven, Emmasingel, Netherlands

[73] Assignee: U.S. Philips Corporation, New York, N.Y.

[22] Filed: Jan. 23, 1973

[21] Appl. No.: 326,040

[30] Foreign Application Priority Data

Feb. 3, 1972 Netherlands .................... 7201391

[52] U.S. Cl. ............................. 178/7.3 R, 325/41

[51] Int. Cl. ........................................ H04n 1/38

[58] Field of Search ........ 178/7.3 R, 7.3 DC, 7.5 R, 178/7.5 DC, 6.6 DC, DIG. 3, DIG. 12; 325/41, 39, 40, 42; 340/146.1 B

[56] References Cited

UNITED STATES PATENTS

| | | | |
|---|---|---|---|
| 3,409,875 | 11/1968 | Jager et al. | 325/41 X |
| 3,461,230 | 8/1969 | Hodge et al. | 178/6.6 DC |
| 3,679,822 | 7/1972 | Wada et al. | 178/6.6 DC |
| 3,736,373 | 5/1973 | Pease | 178/DIG. 3 |

*Primary Examiner*—Benedict V. Safourek

*Attorney, Agent, or Firm*—Frank R. Trifari; Henry I. Steckler

[57] ABSTRACT

A receiver for video signals which are transmitted, for example, by differential pulse code modulation and in which for the recovery of the analog video signal the demodulator is provided with an integrator whose time constant is many times the line period. The output of this integrator is coupled to a fault corrector provided with a fault detector, which fault corrector upon the command of the fault detector replaces a perturbed image line to be applied to the display arrangement by an unperturbed image line which has already been displayed or is still to be displayed.

10 Claims, 3 Drawing Figures

RECEIVER FOR VIDEO SIGNALS

Figure 1:
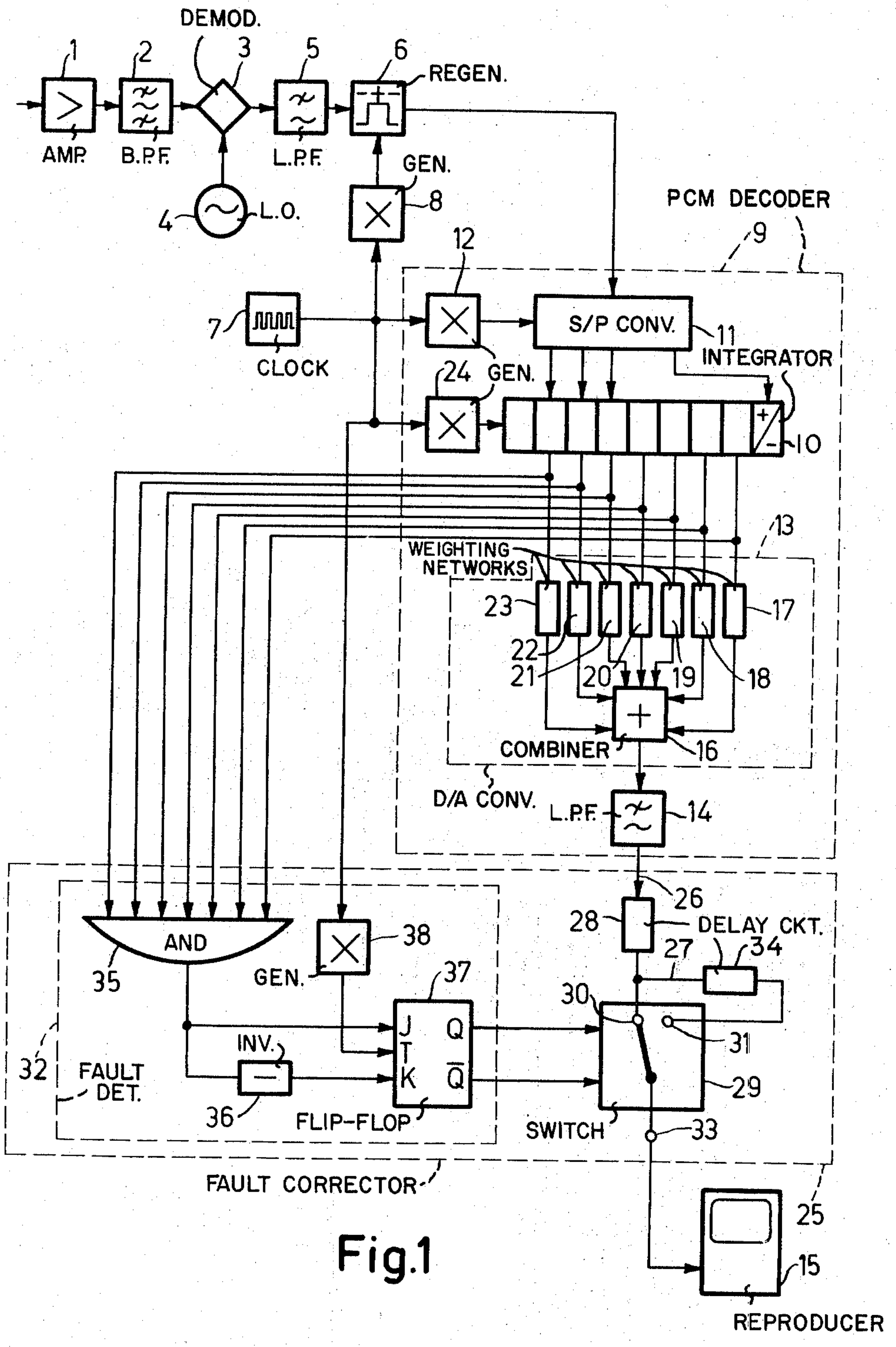

The invention relates to a receiver for the reception of video signals including a plurality of horizontal scanning cycles separated by blanking signals of a given fixed blanking level said video signal being pulse code modulated and being a composite of code groups characterizing variations occurring in said video signal at given instants, said receiver comprising means for applying the received video signal to a pulse code modulation decoder including integrator means having an integration time considerably longer than a horizontal scanning cycle, and including decoder output means.

In particular the pulse code modulated video signal is a differential pulse code modulated one in which the variations in the video signal occurring at successive instants are represented by pulse groups in which one pulse indicates the polarity of the variation and the other pulses indicate the magnitude of the variation.

To realize a satisfactory reproduction quality it is particularly favourable to use such an integrator in such a receiver whose time constant is considerably longer a horizontal scanning cycle. When, for example, with the use of such an integrator a luminance signal is received which has a constant level during a comparatively long period (for example, during one horizontal scanning cycle) then the associated television line is reproduced with a constant luminance. The integrator may advantageously be composed of digital circuits such as counters and stores.

The reproduction quality of the above-described receiver provided with an integrator formed with digital circuits is, however, greatly influenced by the quality of the transmission path. A perturbation of the transmitted pulse group becomes manifest in a perturbation of the output signal from the pulse code modulator decoder. As a result of the long time constant of the integrator such a perturbation of the video signal cannot be eliminated and therefor remains present as an additional variation of the video signal of a television line.

It is an object of the invention to improve the reproduction quality to a considerable extent. According to the invention the receiver furthermore comprises detection means including an input circuit coupled to said integrator means and serving to develop a switching signal when the blanking level of the received video signal does not correspond to said fixed blanking level, switching means having a first and a second input and an output, mean circuit means coupling said pulse code modulator decoder output means to said first switching input to delay the output signal of said decoder for a period of time corresponding to an integral number horizontal scanning cycles, correction circuit means coupled to said decoder output means and connected to the second input of said switching means to delay the output of said decoder for a period of time corresponding to an integral number horizontal scanning cycles, mean circuit and correction circuit means producing video signals mutually delayed for a period of time corresponding to an integral number horizontal scanning cycles, said switching means being responsive to the switching signal to selectively connect the first input of said switching means to its output.

The invention will now be described in detail with reference to the accompanying drawing wherein:

FIG. 1 schematically illustrates a receiver according to the invention and

Figure 2:
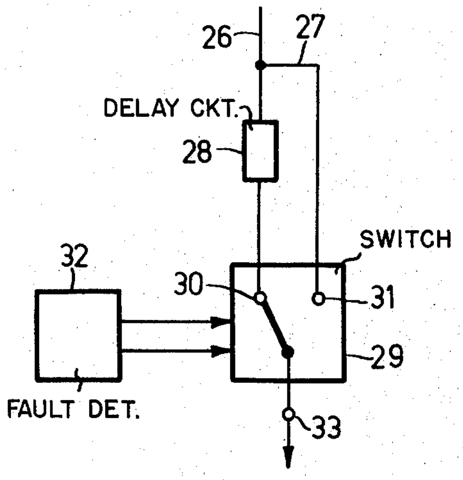
Figure 3:
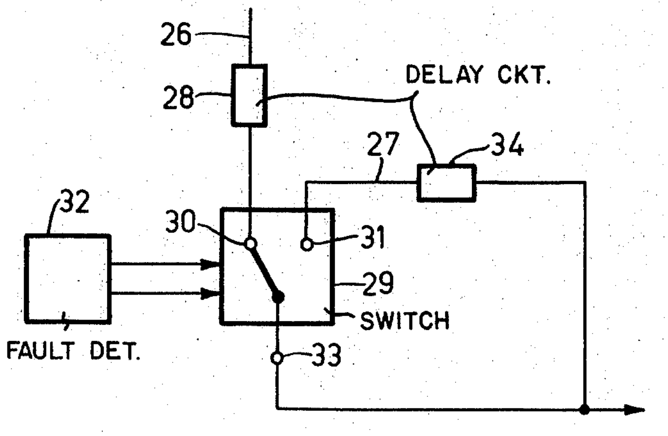

FIGS. 2 and 3 show some modifications of mean and correction circuit means.

The receiver shown in FIG. 1 is adapted for the reception of video signals including a plurality of horizontal scanning cycles separated by blanking signals of a given fixed blanking level. A television line synchronizing signal in the form of a pulse series is added to said video signals in known manner and the pulses of said synchronizing signal indicating the instant of commencement of a television line. The video signals are transmitted in the form of a pulse series which is generated by pulse code modulation and are composite of pulse groups characterizing the variations occurring at given instants in the video signal. The receiver shown is particularly adapted for the reception of video signals transmitted by means of differential pulse code modulation, whereby each differential amplitude value is characterized by four pulses (bits), e.g., one polarity bit and three amplitude bits expressing the magnitude of the differential amplitude in a binary number.

In the receiver shown the received carrier-modulated pulses are applied through a receiver amplifier 1 to a bandpass filter 2, and together with a demodulation carrier to a demodulator 3. Said demodulation carrier is derived from a local carrier oscillator 4. The output signal from the demodulator 3 is furthermore applied to a pulse regenerator 6 through a lowpass filter 5 to recover the originally transmitted pulse series. Said pulse regenerator 6 is controlled by a series of equidistant clock pulses originating from a generator 8 controlled by a central clock pulse oscillator 7.

To recover the analog video signal the regenerated pulse series is applied to a pulse code modulator decoder 9 which is provided with an integrator 10 whose time constant is considerably longer than the duration of a television line (scanning cycle). The integrator shown is constituted by an adder circuit 10 in which a binary number applied thereto, and given by the three amplitude bits of the pulse groups in response to the associated polarity bit, is added to or subtracted from the number already registered. The bits which jointly constitute said binary number are applied in parallel to the adder circuit 10 and derived in this form from a series-to-parallel converter 11 whose input is connected to the output of the pulse regenerator 6 and which in response to a group synchronisation pulse applies a code group of four bits to the parallel output lines. Said group synchronisation pulse is generated by a clock pulse generator 12, which is also controlled by the central clock pulse oscillator 7.

The number registered in the adder circuit 10 is subsequently applied to a digital-to-analog converter 13 whose output signal is applied to a lowpass filter 14 the output of which is coupled to a video reproduction arrangement 15.

In the embodiment shown the adder circuit 10 is adapted to register a binary number having a maximum of seven bits. For regeneration of the analog video signal each bit stored in the adder circuit 10 is applied to the digital-to-analog converter 13 through a separate output lead. This digital-to-analog converter is provided with a combination circuit 16 to which the bits stored in the adder circuit are applied through weighting networks 17 – 23. The transfer functions of these networks are chosen so that the ratio of the transfer functions of each two successive weighting networks such as 23 and 22 is given. for example, by a factor of two.

In the pulse code modulation decoder 9 an analog video signal is reconstructed from the pulse groups applied, thereto, starting from a given reference level in the form of the fixed blanking level of the video signal. Every time at the beginning of a television line the adder circuit 10 is adjusted at a number characterizing the fixed blanking level beginning of a television line with the adder. This is done with the aid of a pulse series whose pulses coincide with the beginning of a television line. This pulse series is derived from a generator 24 which is controlled by the central clock pulse oscillator 7.

To realize an eminent reproduction quality the shape of the recovered video signal must correspond accurately to that of the transmitted analog video signal.

The reproduction quality of the receiver is, however, detrimentally influenced by interferences in the transmission path. These interferences strongly perturb the shape of a pulse series whose pulses jointly characterize the variations in video signal; for example, in such a pulse series pulses are suppressed or extra pulses occur. Since in the decoder 9 each number registered in the adder circuit 10 constitutes the basis for a subsequent registration, a perturbed binary number forming part of a perturbed pulse series produces an error in the reproduced video signal which error remains present in a scanned television line at least until the end of this line due to the ideal character of the integrator. On the display such an error gives rise to a long horizontal stripe having a clearly visible faulty luminance level.

In spite of said perturbations in the pulse series transmitted, an eminent reproduction of the received video signals is obtained by means of a fault corrector 25 incorporated in the receiver, which corrector is provided with a main channel 26 and a correction channel 27 whose inputs are coupled to the output of the decoder 9 and in which at least the main channel 26 includes a delay circuit 28. From said video signals are derived which are mutually delayed for a period of time corresponding to an integral number of horizontal scanning cycles. Said fault corrector furthermore includes: an output circuit in the form of a switching arrangement 29 provided with a first and a second input 30 and 31 which are connected to the outputs of the main channel 26 and of the correction channel 27, respectively; a fault detector 32 whose input is coupled to the output of the integraor 10 and whose output is coupled to the switching arrangement 29. Whenever the blanking signal occurs the fault detector 32 compares the level of the signal derived from the integrator with the fixed blanking level for generating a switching signal which in case of level conformity connects the output 33 of the switch 29 to the output of the main channel and in case of level non-conformity connects this output 33 to the output of correction channel 27 during an integral number of horizontal scanning cycles.

In the embodiment shown the main channel 26 is connected to the output of the lowpass filter 14 and the delay circuit 28 is constituted by a delay line for the analog output signal of the decoder 9. Also the correction channel 27 includes a delay line 34 which, likewise as the delay line 28, has a delay coressponding to (one) horizontal scanning cycle. The input of the correction channel is connected to the output of the delay line 28, while its output is connected to the second input 31 of the switching arrangement 29. This switching arrangement is only symbolically shown in the Figure by means of a two position switch, but may be simply built up from electronic components.

In the embodiment shown a reference level for the detector 32 is chosen which is reproduced by a binary number consisting of seven "1" bits with which reference level the blanking signal derived from the integrator 10 is compared in the fault detector 32. To this end this fault detector is constituted by a selection gate in the form of an AND-gate 35 to which simultaneously all bits registered in the adder circuit 10 are applied in parallel and the output signal of which is directly applied to the J-input and through an inverter 36 to the K-input of a JK flipflop 37. This flip-flop is controlled through its time input T by a pulse generator 38 which in turn is controlled by the central clock pulse oscillator 7. This generator applies a clock pulse to this flipflop every time after the occurrence of a line synchronizing pulse. The output signals Q and $\overline{Q}$ from this flipflop which are inverted relative to each other are both applied to the switching arrangement 29 whose output 33 is connected to the input 30 when a pulse occurs in the signal Q and the output 33 is connected to the input 32 when a pulse occurs in the signal $\overline{Q}$.

In the fault corrector shown the video signals of two successive television lines are applied to the two inputs 30, 31 of the switching arrangement 29. The blanking levels of these lines are compared by the fault detector with the reference level of seven "1" digits. When the blanking level of the last compared television line, that is to say, the television line stored in the delay line 28, corresponds to said reference level, AND-gate 35 provides a pulse which through the JK-flipflop connects the input 30 of the switching arrangement 29 to its output 33. Consequently the television line stored in the delay line 28 is applied to the display arrangement 15. When, however, due to a perturbation of the received pulse series the blanking level of the last stored television line does does not correspond to the reference level, the television line stored in the delay line 34 of the correction channel 27 is applied to the display arrangement by cooperation of the fault detector 32 and the switching arrangement 29. In contrast with the television line stored in the delay line 28 this line will not be perturbed due to the fact that the probability that this line is perturbed too is considerably smaller than the probability that an arbitrary television line is perturbed.

By using the steps according to the invention it is thus achieved that to a great extent the reproduction quality is independent of the interferences occurring in the transmission path, for each perturbed television line is replaced by the preceding unperturbed line.

Conversely it is achieved that for a given admissible number of perturbed television lines (for example, one per second) the probability of perturbation of a transmitted pulse during the transmission of the coded video signal may increase to a considerable extent, for example, by a factor of 100 without reducing the reproduction quality.

FIG. 2 shows a modification of the fault corrector 25 in the receiver according to FIG. 1, which corrector differs from that corrector shown to FIG. 1 in that the correction channel 27 is constituted by a lead only which connects the input of the delay line 28 directly to the input 31 of the switching arrangement 29. After detection of a perturbed television line which is stored in the delay line 28 the television line immediately following this perturbed line is applied to the reproduction arrangement 15.

A further embodiment of the fault corrector is shown in FIG. 3 and differs from the embodiment of FIG. 1 in that the input of the correction channel 27, which is also provided with a delay line 34 having a delay time corresponding to one horizontal scanning cycle, is connected to the output 33 of the switching arrangement 29, while the output of the delay line 34 is connected to the input 31 of the switching arrangement 29.

When more particularly an unperturbed television line is applied through the input 30 to the output 33 of the switching arrangement, this television line is also stored in the delay line 34. By receiving a perturbed line the output 33 of the switching arrangement is connected to the input 31 so that a feedback occurs of the television line stored in the delay line 34 and thus results in a repeated reproduction of this line by the reproduction arrangement 15 until upon reception of an unperturbed television line the output 33 of the switching arrangement is again connected to the input 30.

The embodiment shown in FIG. 3 therefore permits different successive television lines to be perturbed without reducing the reproduction quality.

It is to be noted that the periods of delay introduced by the delay lines 28 and 34 may be chosen to be mutually different, but each of these periods must be an integral multiple of the horizontal scanning cycle. For controlling in the fault detector the blanking leads of the video signal, any arbitrary binary number may be allotted to the reference level instead of the binary number consisting of seven "1" digits. In which case the fault detector shown in FIG. 1 may also be utilized by incorporating an inverter in one or more output leads of the adder circuit in such a manner that for a correct reference level exclusively "1" bits are applied to the AND-gate. Alternatively, the output leads of the adder circuit may be connected to separate selection gates instead of jointly to a single AND-gate in order to control each of the registered bits with reference to a criterion. Instead of an exact comparison of the blanking level and the reference level, it is also possible to control with said fault detector whether the blanking level satisfies a given minimum and/or maximum requirement, for example, the requirement that the bits of the highest weight in the blanking level are "1". Instead of the binary output signal from the adder circuit 10 the analog output signal from the low-pass filter 14 may alternatively be used to control the blanking level occurring therein with reference to a given analog reference level.

What is claimed is:

1. Receiver for the reception of video signals including a plurality of horizontal scanning cycles separated by blanking signals of a given fixed blanking level said video signal being pulse code modulated and having code groups characterizing variations occurring in said video signal at given instants, said receiver comprising a pulse code modulation decoder, means for applying the received video signal to said pulse code modulation decoder, said decoder including integrator means having an integration time considerably longer than a horizontal scanning cycle, and including a decoder output terminal means, said receiver further comprising detection means including an input circuit coupled to said decoder for developing a switching signal when the blanking level of the received video signal is greater than a selected error criterion with respect to said fixed blanking level, switching means having first and second input terminal means and an output terminal means, main channel means coupling said pulse code modulator decoder output means to said first switching input terminal for delaying the output signal of said decoder for a period of time corresponding to an integral number horizontal scanning cycles, correction channel means having an output coupled to said second input terminal means of said switching means and an input coupled to a remaining one of said terminal means to change the output signal of said switching means for a period of time corresponding to an integral number horizontal scaning cycles, said main and correction channel means producing video signals mutually delayed for a period of time corresponding to an integral number horizontal scanning cycles, said switching means being responsive to the switching signal to selectively connect the second input of said switching means to its output.

2. A receiver as claimed in claim 1, wherein the main channel comprises a delay line whose delay period is equal to an integral number of horizontal scanning cycles.

3. A receiver as claimed in claim 2, wherein the correction channel comprises a delay line whose delay period is equal to an integral number of horizontal scanning cycles.

4. A receiver as claimed in claim 3, wherein the delay period of the delay lines incorporated in the main channel and in the correction channel are mutually equal, while the input of the correction channel is coupled to the output of the main channel.

5. A receiver as claimed in claim 3, wherein the input of the correction circuit is coupled to the output terminal means of the switching means.

6. A receiver as claimed in claim 1, adapted for the reception of video signals being differential pulse code modulated, said applying means comprising a series-to-parallel converter means for receiving said code groups, said integrator means comprising a binary adder circuit means coupled to said converter for adding the binary words each determined by a code group, said binary adder circuit comprising a number of parallel output leads, and said detection means comprising a selection gate having a number of inputs coupled to said parallel output leads of the adder circuit.

7. A method for receiving pulse code modulated signals having periodic fixed level portions and code groups representative of said fixed level portions and baseband signal variations, said method comprising decoding said PCM signals by integrating with a time constant longer than the interval between said fixed level portions, detecting when a received code group representative of one of said fixed level portions is greater than a selected error criterion with respect to a stored code group representative of said fixed level portions, and changing the time of providing said baseband signal for a time equal to an integer multiple of said interval upon detecting that said error criterion is exceeded.

8. A method as claimed in claim 7 wherein said detecting step comprises detecting when there is any error between said received stored and received code groups.

9. A method as claimed in claim 7 wherein said PCM signals comprise differential PCM, and further comprising converting series to parallel bits before said decoding step, and said integrating step comprises adding said bits.

10. A method as claimed in claim 7 wherein said changing step comprises time delaying the time of providing said baseband signal.

* * * * *